US010341396B2

(12) United States Patent
Kumar Selvaraj

(10) Patent No.: US 10,341,396 B2
(45) Date of Patent: Jul. 2, 2019

(54) METHOD AND DEVICE FOR TRANSMITTING A TEXT MESSAGE OVER A VOICE CALL

(71) Applicant: WIPRO LIMITED, Bangalore (IN)

(72) Inventor: Ashok Kumar Selvaraj, Bangalore (IN)

(73) Assignee: Wipro Limited, Bangalore (IN)

( * ) Notice: Subject to any disclaimer, the term of this patent is extended or adjusted under 35 U.S.C. 154(b) by 105 days.

(21) Appl. No.: 15/481,555

(22) Filed: Apr. 7, 2017

(65) Prior Publication Data
US 2018/0295163 A1    Oct. 11, 2018

(51) Int. Cl.
H04L 29/06 (2006.01)
H04W 4/14 (2009.01)

(52) U.S. Cl.
CPC ...... *H04L 65/1089* (2013.01); *H04L 65/1006* (2013.01); *H04L 65/1069* (2013.01); *H04L 65/1096* (2013.01); *H04W 4/14* (2013.01)

(58) Field of Classification Search
None
See application file for complete search history.

(56) References Cited

U.S. PATENT DOCUMENTS

| 6,757,732 | B1* | 6/2004 | Sollee | H04L 29/06 375/222 |
|---|---|---|---|---|
| 8,140,057 | B2 | 3/2012 | Grosch et al. | |
| 2007/0116246 | A1* | 5/2007 | Walker | H04M 1/2478 379/355.02 |
| 2007/0123203 | A1* | 5/2007 | Kim | H04M 11/064 455/403 |
| 2008/0123603 | A1* | 5/2008 | Cai | H04M 7/129 370/338 |
| 2010/0124318 | A1* | 5/2010 | Cai | H04M 3/42382 379/93.24 |
| 2010/0250680 | A1* | 9/2010 | Bhatt | H04L 45/306 709/206 |
| 2010/0304717 | A1* | 12/2010 | Bhatt | H04W 4/14 455/412.1 |
| 2010/0304765 | A1* | 12/2010 | Bhatt | H04L 67/00 455/466 |
| 2014/0119526 | A1* | 5/2014 | Yerli | H04M 3/4365 379/207.02 |
| 2017/0078490 | A1* | 3/2017 | Kaminsky | H04M 11/06 |

* cited by examiner

Primary Examiner — Duc T Duong
(74) Attorney, Agent, or Firm — Finnegan, Henderson, Farabow, Garrett & Dunner, LLP

(57) ABSTRACT

A method and device are described for transmitting a text message over a voice call. The method includes initiating a Session Initiation Protocol (SIP) session for the voice call wherein the SIP session comprises at least one of a Session Initiation Protocol (SIP) INVITE request and a SIP INFO request. The method includes inserting a text message in at least one of the SIP INVITE request and the SIP INFO request. The method further includes transmitting, by the communication device, the text message over the SIP session to a called device.

17 Claims, 6 Drawing Sheets

METHOD AND DEVICE FOR TRANSMITTING A TEXT MESSAGE OVER A VOICE CALL

TECHNICAL FIELD

The present subject matter is related, in general, to Internet Protocol based voice calling, and more particularly, but not exclusively to, a method and a system for transmitting a text message over a voice call.

BACKGROUND

Communication among individuals over telephone and mobile has increased tremendously over the past decade. A voice call may be initiated from a calling device and received by a called device. However, with the increase in incoming calls, which is the norm of the present times, a callee may receive multiple calls per day. The callee may not know how to prioritize receipt of the calls. In other words, the callee may not know the importance of a call when the call comes in as the callee has no context to the call before the callee actually answers the call. There may be situations for example, where a caller may be in an emergency and place a call to the callee to ask for help. However, the callee may not prioritize this call because the callee may not know the reason for the caller calling and may assume a lower priority for the call. In this situation, the callee may choose to ignore incoming voice calls from the caller. Thus, the callee is unaware of the importance of the incoming voice calls and may choose to ignore an important call without knowing the importance of the call.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there may be provided a method of transmitting a text message over a voice call. The method may include, initiating a Session Initiation Protocol (SIP) session for the voice call. The SIP session may include at least one of a Session Initiation Protocol (SIP) INVITE request and a SIP INFO request. The method may include, inserting a text message in at least one of the SIP INVITE request and the SIP INFO request. The method may further include, transmitting the text message over the SIP session.

According to embodiments illustrated herein, there may be provided a communication device for transmitting a text message over a voice call. The communication device may comprise a processor and a memory communicatively coupled to the processor. The memory may store instructions which may cause the processor to initiate a Session Initiation Protocol (SIP) session for the voice call. The SIP session may include at least one of a Session Initiation Protocol (SIP) INVITE request and a SIP INFO request. The memory may store instructions which may cause the processor to insert a text message in at least one of the SIP INVITE request and the SIP INFO request. Further, the memory may store instructions which may cause the processor to transmit the text message over the SIP session.

The foregoing summary is illustrative only and is not intended to be limiting in any way. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and the like indicate that the embodiment(s)

or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
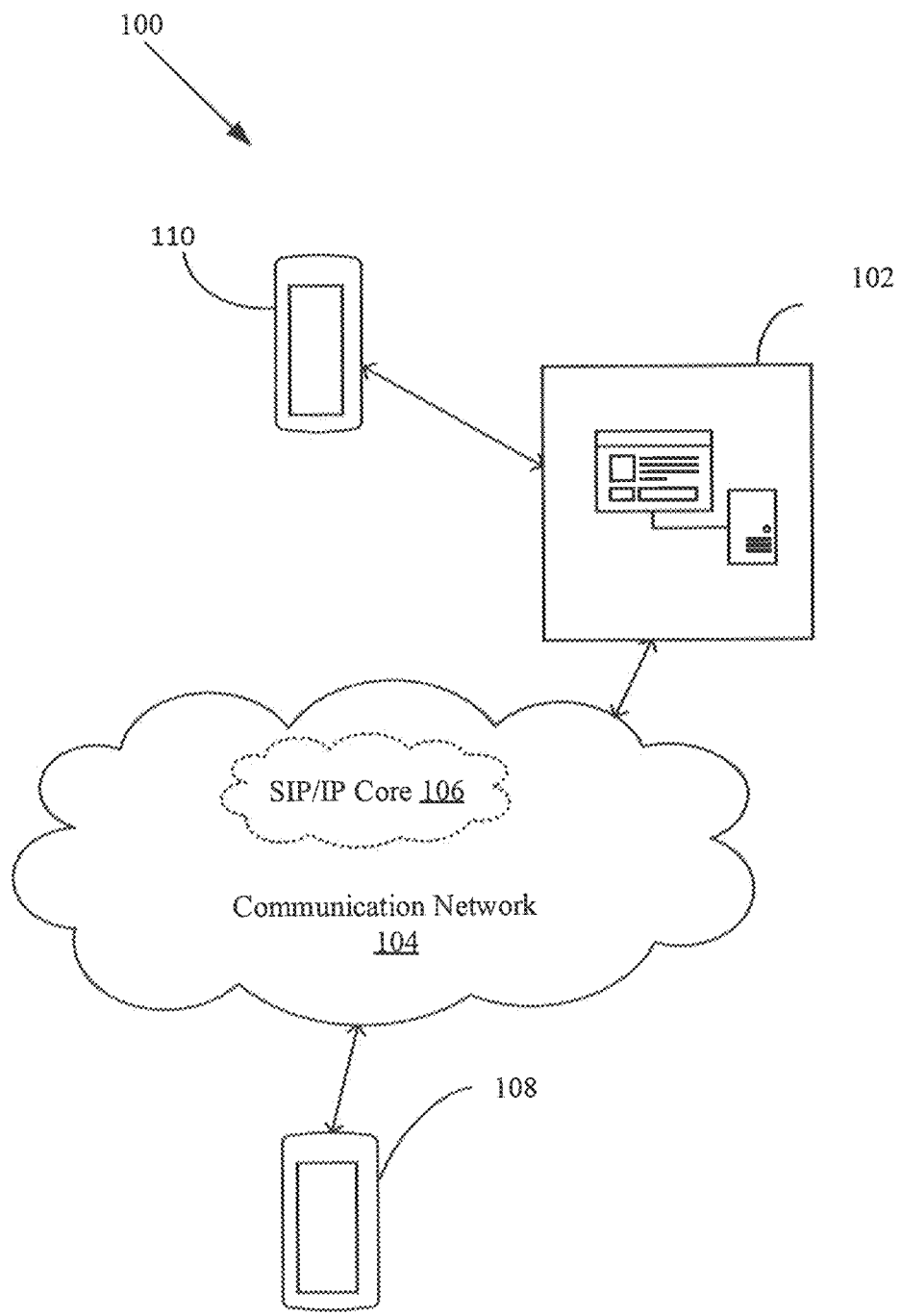
FIG. 1 is a block diagram illustrating an example system environment in which various embodiments of the present disclosure may function.

FIG. 1 is a block diagram that illustrates an example environment 100 in which various embodiments of the method and the system may be implemented. The environment 100 may include a telephony application server 102, a communication network 104 having an SIP/IP core 106, one or more communication devices such as a calling device 108 and a called device 110, also referred to as a called communication device, used by users for voice calling. The telephony application server 102 may be communicatively coupled to the calling device 108 and called device 110 via the SIP/IP core network 106. In an embodiment, the calling device 108 may communicate with the called device 110 via the telephony application server 102 using a Session Initiation Protocol (SIP) via the SIP/IP core 106.

The telephony application server 102 may refer to a computing device or a software framework hosting an application or a software service. In some embodiments, the telephony application server 102 may be implemented to execute procedures such as, but not limited to, programs, routines, or scripts stored in one or more memories for supporting the hosted application or the software service. In an embodiment, the hosted application or the software service may be configured to perform one or more predetermined operations. The telephony application server 102 may be realized through various types of application servers such as, but are not limited to, a Java application server, a .NET framework application server, a Base4 application server, a PHP framework application server, or any other application server framework.

In some embodiments, the telephony application server 102 may be a Multimedia Telephony Application Server (MMTel-AS). The MMTel-AS may refer to a computing device which may be a carrier class application server for voice and multimedia applications providing services for next generation mobile and fixed networks. The MMTel-AS may provide Internet Protocol based multimedia communications applications to end users. The MMTel-AS may support legacy telephony services as well as next generation services like multi-device applications, multi-media services over multiple accesses like mobile 2G, 3G, 4G, Wi-Fi and fixed accesses. The MMTel-AS may include several Application Server (AS) roles to support consumer as well as enterprise voice and multimedia services. In an embodiment, the MMTel-AS follows the 3GPP/NGN IP Multimedia Subsystem (IMS) multimedia telephony service (MMTel) standard. In some instances, the telephony application server 102 may be referred to as MMTel-AS for the purpose of explanation, as example only, and is not to be considered as limiting the scope of the invention.

In some embodiments, the calling device 108 may refer to a communication device used by a caller. The calling device 108 may comprise one or more processors and one or more memories. The one or more memories may include computer readable instructions that are executable by the one or more processors to perform predetermined operations. In an embodiment, the calling device 108 may include a user-interface. The user-interface may be provided to the user to input a text message to be transferred over a voice call. The calling device 108 and the called device 110 may include, but are not limited to, a personal computer, a laptop, a personal digital assistant (PDA), a mobile device, a tablet, a soft phone or any other computing device.

The calling device 108 and the called device 110 may run SIP client software (i.e., SIP user agent), which enables the calling device 108 and the called device 110 to engage in multimedia (voice, video, data, etc.) communications over Internet Protocol based networks. For purposes of participating in such communications, the calling device 108 may be equipped with, for example, a headset and web camera. The functionality of the calling device 108 is further explained in conjunction with FIG. 2.

In an embodiment, the communication network 104 may correspond to a communication medium through which the telephony application server 102, the calling device 108 and the called device 110 may communicate with each other. Such communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 104 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

The SIP/IP core 106 may include a number of SIP (Session Initiation Protocol) proxies and SIP registrars as defined in the SIP standard. The SIP/IP core 106 may perform a number of functions to support establishing real time text message session over the voice call. The SIP/IP core 106 may perform routing of an SIP signaling and address resolution services. The SIP/IP core 106 may further perform authentication and authorization of the user at an end device such as the calling device 108 and the called device 110, based on the user's service subscription. The SIP/IP core 106 may provide and maintain registration of the end devices and their associated User Addresses. The SIP/IP core 106 may further maintain unique identifiers for the end devices. The SIP/IP core 106 may provide list of registered devices and their capabilities.

Figure 2:
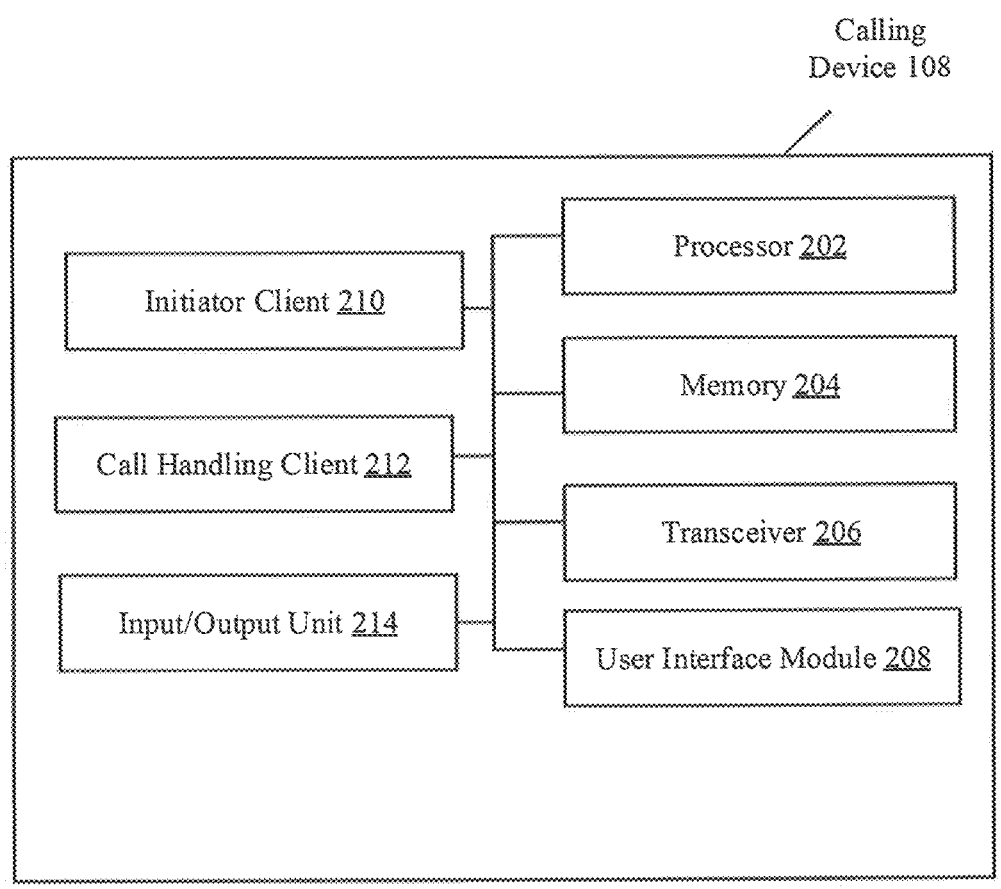
FIG. 2 is a block diagram illustrating a communication device configured to transmit a text message over a voice call in accordance with some embodiments of the present disclosure.

FIG. 2 is a block diagram illustrating a communication device configured to transmit a text message over a voice call in accordance with some embodiments of the present disclosure. The communication device illustrated herein is the calling communication device, also referred to as a calling device such as the calling device 108, configured to transmit a text message over the voice call. The calling device 108 comprises a processor 202, a memory 204, a transceiver 206, an user interface module 208, an initiator client 210, a call handling client 212 and an input/output (I/O) unit 214. The processor 202 may be communicatively coupled to the memory 204, the transceiver 206, the user interface module 208, initiator client 210, the call handling client 212 and the input/output unit 214.

The processor 202 comprises suitable logic, circuitry, and interfaces that may be configured to execute a set of instructions stored in the memory 204. The processor 202 may be implemented based on a number of processor technologies known in the art. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 comprises suitable logic, circuitry, interfaces, and/or code that may be configured to store the set of instructions, which may be executed by the processor 202. In an embodiment, the memory 204 may be configured to store one or more programs, routines, or scripts that may be executed in coordination with the processor 202. The memory 204 may be implemented based on a Random Access Memory (RAM), a Read-Only Memory (ROM), a Hard Disk Drive (HDD), a storage server, and/or a Secure Digital (SD) card.

The transceiver 206 comprises suitable logic, circuitry, and interfaces that may be configured to retrieve a set of operations associated with the communication device to transmit a text message in the voice call, via the communication network 104. The transceiver 206 may transmit the text message in the SIP INVITE request. The transceiver 206 may also transmit the text message in an SIP INFO request. The transceiver 206 may implement one or more known technologies to support wired or wireless communication with the communication network. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Text message Service (SMS).

The user interface module 208 comprises suitable logic, circuitry, interfaces, and/or code that may be configured to provide the necessary user interfaces for the clients to provide various input options to a user of the calling device 108. In some embodiments, user interface module 208 may provide a platform on the calling device 108, for the caller to add the text message during the initiation of the voice call. The initiation of the voice call is done when a SIP session is initiated. In some other embodiments, the user interface module 208 may add the text message during call ringing for the voice call. The call ringing refers to the time period during which the calling device 108 receives a "180" ringing response from a called device such as the called device 110.

The initiator client 210 comprises suitable logic, circuitry, and interfaces that may be configured to initiate sending of the text message over the voice call. In this case, the initiator client 210 may determine whether the called device 110 is capable of receiving and interpreting the text message during the voice call. In some embodiments, the initiator client 210 may determine if the called device 110 has a corresponding recipient client for receiving and interpreting the text message transmitted by initiator client 210 associated with calling device 108. The initiator client 210 may be configured to place the voice call request with the text message to the recipient client. In an embodiment, the initiator client 210 of calling device 108 may add the text message at runtime during the call ringing. The initiator client 210 may be configured to insert the text message in a body of SIP INFO package as a reason for the voice call. The initiator client 210 may further insert call correlation information in the body of the SIP INFO request. The call correlation information may be used to correlate the voice calls with the text message such that the called device 110 identifies that a particular text message is associated with a particular voice call. In an embodiment, the initiator client 210 may insert a call-reason feature tag in a subject field of the SIP INVITE request header when the text message is inserted to be added in the SIP INVITE request. The call-reason feature tag may enable the recipient client of the called device 110 to identify that the SIP session is associated with the option of adding a text message enabled and process the message and display it during the call ringing as will be explained in conjunction with FIG. 3.

The call handling client 212 also referred to as multimedia telephony service (MMTel) Client 212 may be configured to handle call setup and establishment between the initiator client 210 associated with calling device 108 and the recipient client associated with the called device such as called device 110. The call handling client 212 may initiate the SIP session for the voice call. In some embodiments, the call handling client 212 may be configured to transmit the SIP INVITE request with the call-reason feature tag. In some other embodiments, the call handling client 212 may be configured to transmit the SIP INFO request with the text message.

The Input/Output (I/O) unit 214 comprises suitable logic, circuitry, and interfaces that may be configured to receive an input or provide an output. The input/output unit 214 comprises various input and output devices that are configured to communicate with the processor 202. Examples of the input devices include, but are not limited to, a keyboard, a mouse, a joystick, a touch screen, a microphone, and/or a docking station. Examples of the output devices include, but are not limited to, a display screen and/or a speaker. In an embodiment, the I/O unit 214 may work in conjunction with the user interface module 208 to provide the user an interface to the user for providing inputs and to receive outputs.

The interactions between the client modules such as the initiator client 210 associated with the calling device 108, the recipient client associated with called device 110 and the call handling client 212 may be performed by a CR-1 interface. The CR-1 interface may support a functionality of determining the capabilities of the devices for adding and displaying a message during the voice call. The CR-1 interface may support initiating a message in-band over the voice call between the communication devices 106. The CR-1 interface may support establishing the SIP session which includes initiation, modification and termination of the voice call between the communication devices 106. The CR-1 interface may support delivery of the voice call, text messages over the voice call, alert notifications and the call correlation information. The CR-1 interface may support analyzing and displaying of incoming messages over the voice call session. The CR-1 interface may support storing the text messages for unanswered calls. The CR-1 interface may support generating alert notifications to the called device 110 for a popup message for the pre-configured time duration. The CR-1 interface may support control of messages in the established voice call.

Figure 3:
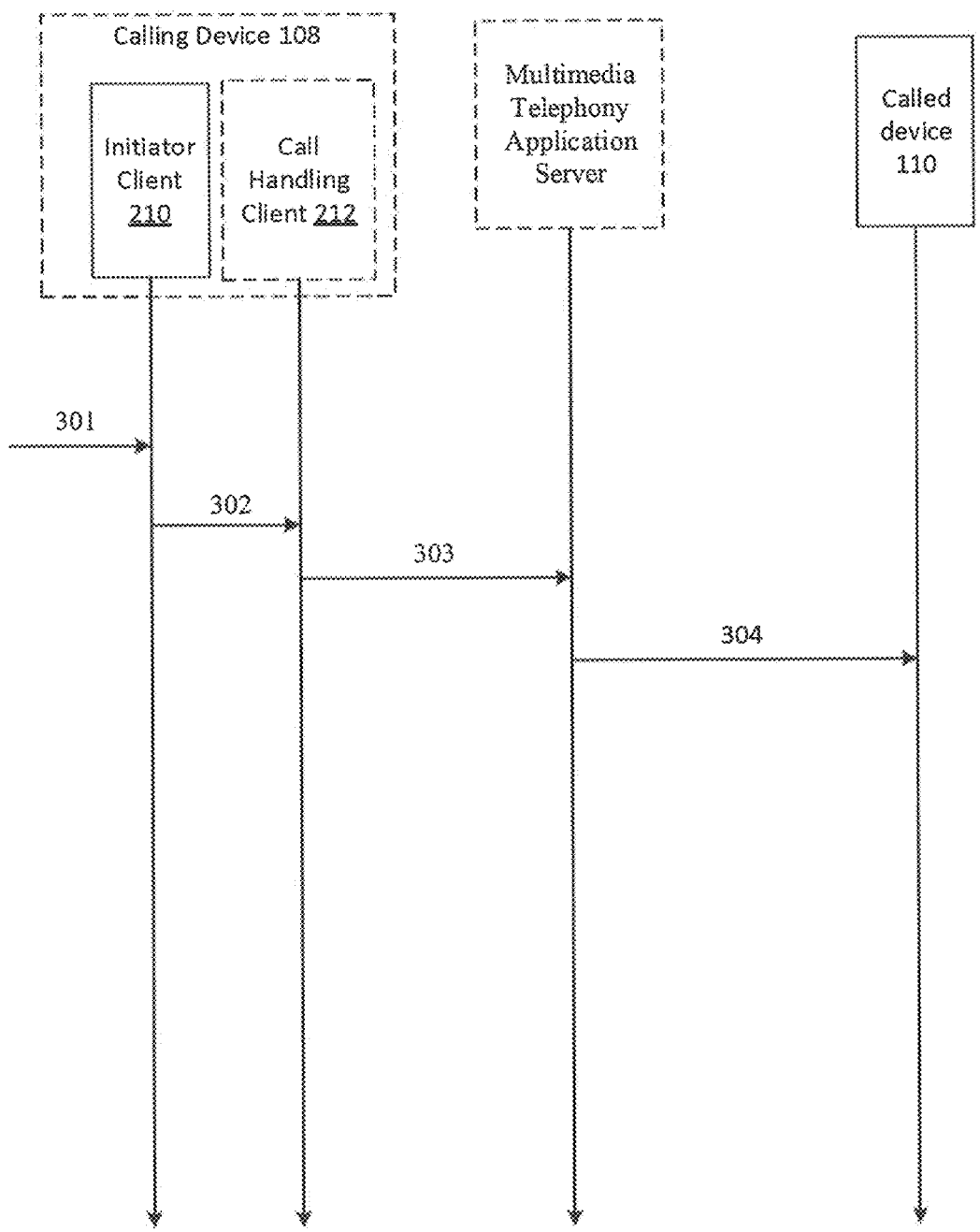
FIG. 3 illustrates an exemplary sequence diagram for transmitting a text message over a voice call in accordance with some embodiments of the present disclosure.

FIG. 3 illustrates an exemplary sequence diagram for transmitting a text message over a voice call in accordance with some embodiments consistent with the present disclosure. The sequence diagram of FIG. 3 illustrates a sequence of steps by which a caller i.e. the user of a calling communication device such as calling device 108 may enable a call-reason feature in accordance with some embodiments of the present disclosure. The call-reason feature may refer to a feature wherein the reason of the call may be communicated by the calling device 108 to a called communication device such as called device 110 in the form of the text message. The text message may be displayed at the called device 110 during call ringing or incoming call alert. Upon enabling the call-reason feature option while placing the voice call, the initiator client 210 may enable a media pipeline for transmission of both voice and the text message in a SIP session when the voice call is setup from the initiator client 210 of the calling device 108 to a recipient client of the called device 110.

To support the text message during the voice call, the initiator client 210 and the recipient client may exchange signaling messages. In some embodiments, the initiator client 210 may send a Session Initiator Protocol (SIP) OPTIONS message to the Multimedia Telephony Application Server 102. The SIP OPTIONS may include a call-reason feature tag indicating the text message to be sent in the SIP session for the voice call. The Multimedia Telephony Application Server 102 sends the SIP OPTIONS message to the recipient client of the called device 110. If the recipient client of the called device 110 supports text messages over the voice call, then the recipient client may send a "200" OK response message to the Multimedia Telephony Application Server. As known to a person of ordinary skill in the art, a "200" OK response is a response indicating that a request made has succeeded. Further, the Multimedia Telephony Application Server forwards the "200" OK response to the initiator client 210. The initiator client 210 of the calling device 108 discovers the support of text messages over the voice call setup when the "200" OK response is received from the recipient client associated with the called device 110.

In order to transmit the text message over a voice call, a caller may initially compose the text message to be transmitted. The caller may use user interface module 208 to create the text message to be transmitted over the voice call. Thereafter, at step 301, the initiator client 210 associated with the calling device 108 may insert the text message in an SIP INVITE request. The initiator client 210 may insert the text message in a Session Description Protocol (SDP) body of the SIP INVITE request. Further, a call-reason tag may be added by the initiator client 210 in a subject field of the SIP INVITE request header indicating the insertion of a text message in the SIP session for a called device 110.

The initiator client 210 may send the SIP INVITE request to the recipient client with media pipeline "m=audio" and audio attribute "a=sendreceive", and "subject=reason for call" for establishing the voice call with the text message. The initiator client 210 may also provide call correlation information ("<call-correlation-info>") along with the SIP INVITE request. The <call-correlation-info>" may be sent in the SIP INVITE request along with the text message to the called device 110. The call correlation information may be used to correlate the voice calls with the text message such that the called device 110 identifies that the text message is associated with the voice call and appropriately displays the text message during the call ringing at the called device 110. The call correlation information may be inserted by the initiator client 210 in the SIP INVITE request while establishing the voice call (SIP session) with the called device 110.

The call correlation information i.e. <call-correlation-info> is an element which is used to associate the voice call with the text message. The call correlation information may include a unique identifier of the calling communication device, in this case the calling device 108, a unique identifier of the called communication device, in this case the called device 110 and a unique identifier for identifying a Packet Switched (PS) call transaction. For example, the format of the call correlation information may include a <from> element, which is the unique identifier of the calling device 108. The unique identifier may be either a Mobile Station International Subscriber Directory Number (MSISDN) or SIP Uniform Resource Identifier (URI). The call correlation information may further include a <to> element, which represents the unique identifier of the called device 110. The unique identifier of the called device 110 may be either MSISDN or SIP URI. Additionally, the call correlation information may include a <call-seq> element, which is the unique identifier for identifying a Packet Switched (PS) call transaction. The call correlation information may also include a <subject> element, which may contain the information (reason) about the call, which may be the text message.

At step 302, the initiator client 210 may pass on the SIP INVITE request containing the text message and the call correlation information to the call handling client 212. The call handling client 212 on the caller device 108 may then initiate the voice call with the called device 110 at step 303. The call initiation may include initially establishing a connection with the Multimedia Telephony Application Server 102. The Multimedia Telephony Application Server 102 supports legacy telephony services as well as next generation services like multi-device applications, multi-media services over multiple accesses like mobile 2G, 3G, 4G, Wi-Fi and fixed accesses. The Multimedia Telephony Application Server 102 thereafter establishes a connection with the called device 110 at step 304 and transmits the SIP INVITE request to the called device 110. The called device 110 receives the SIP INVITE request and provides a notification of the incoming call. Given below is an example of an SIP INVITE request when the text message is inserted at the first instance of initiation of the voice call:

```
Header:
Subject: Call-Reason
SDP:
m=audio 1024 RTP/AVP 0
a=rtpmap:0 PCMU/8000 sendreceive
<Call Correlation Info>
From: Caller
To: Callee
Msg: "Grandpa hospitalized, pick up"
</Call Correlation Info>
```

In other words, the called device 110 receives an incoming call alert with the text message. The called device 110 in this case may display the text message along with the call ringing notification. The user of the called device 110 may accept or reject the call based on the message associated with the call.

Figure 4:
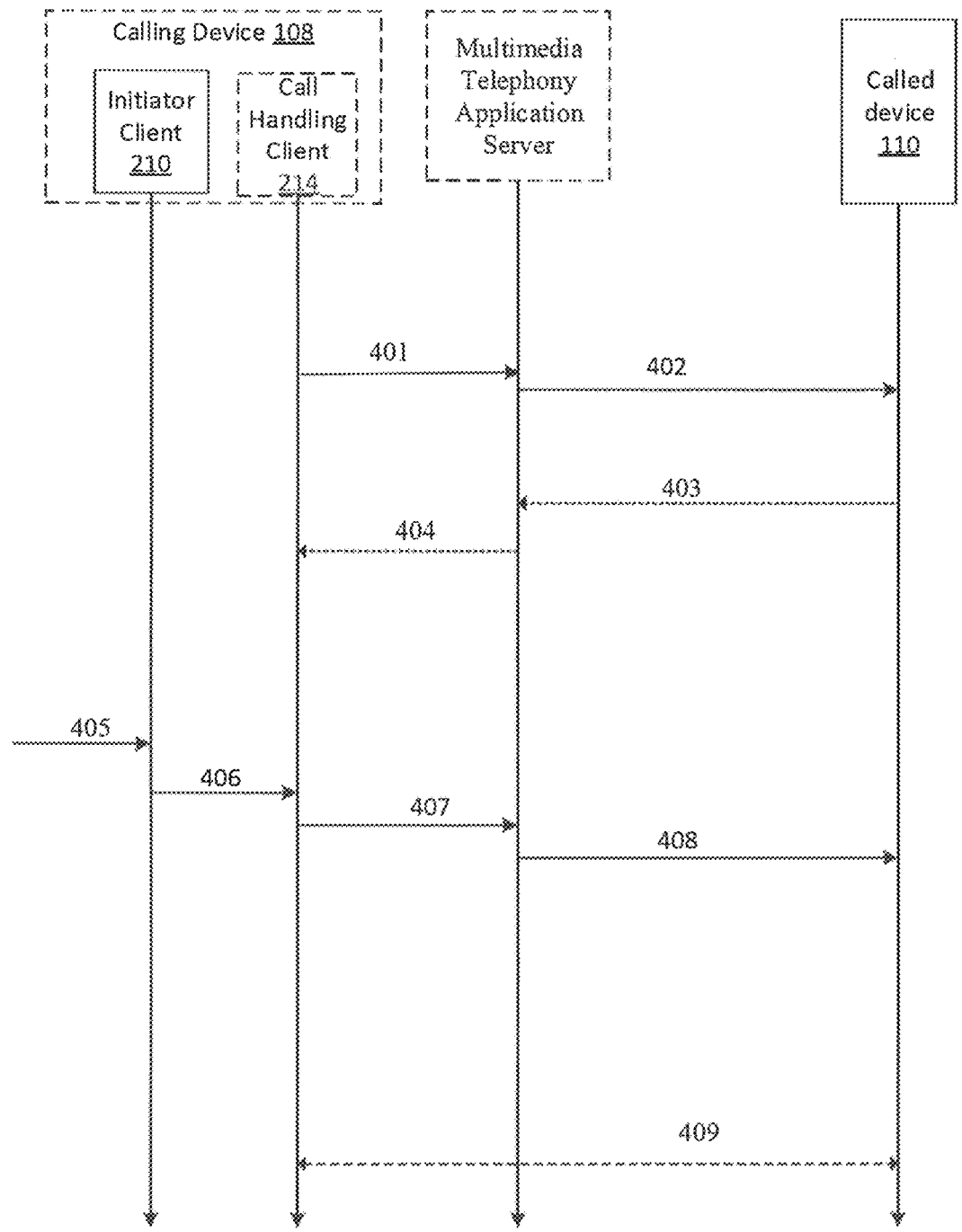
FIG. 4 illustrates an exemplary sequence diagram for transmitting a text message over a voice call in accordance with another embodiment of the present disclosure.

FIG. 4 illustrates an exemplary sequence diagram for transmitting a text message over a voice call in accordance with some embodiments of the present disclosure. The sequence diagram of FIG. 4 illustrates inserting the text message by the initiator client 210 at run time during the call ringing. At step 401, a voice call is initiated between a calling communication device such as the calling device 108 and a called communication device such as the called device 110. The call handling client 212 on the calling communication device i.e. the calling device 108 initiates an SIP session by sending a SIP INVITE request to the called device 110. In an example, the initiator client 210 sends a SIP INVITE request to the recipient client of the called device 110 with media pipeline "m=audio" and audio attribute "a=sendreceive", and a SIP INFO package with Recv-Info having a SIP INFO package name for example "X". Given below is an example of the SIP INVITE request when the user of the caller device 108 selects the call-reason feature option and makes a call without entering the text message for call reason.

```
SIP INVITE
    SDP:
        m=audio 1024 RTP/AVP 0
        a=rtpmap:0 PCMU/8000 sendreceive
        Recv-Info: X (package name)
```

At 402, the called device 110 may receive an incoming call alert with the SIP INVITE request. Upon receiving the SIP INVITE request for the voice call, the recipient client associated with the called device 110 may send a "180" ringing response to the Multimedia Telephony Application Server 102 at step 403. The "180" ringing response is a provisional response from the called device 110 to the calling device 108 on receiving the SIP INVITE request. The "180" ringing response may be routed to the calling device 108 via the Multimedia Telephony Application Server 102. At step 404, the calling device 108 receives the "180" ringing response.

Thereafter, at step 405, the initiator client 210 of the calling device 108 may include a text message provided by the caller for the voice call. In an example, the caller is provided an option by the user interface module 208 at the calling device 108 to insert the text message during call ringing tone. The text message may be inserted in the body of the SIP INFO request for display at the called device 110 during the call ringing. For example, the caller may insert a text message saying, for example, "Grandpa hospitalized, pick up" if a callee does not answer the call even after a few call rings. The initiator client 210 of the calling device 108 may insert the text message in the body of SIP INFO package. The initiator client 210 of the calling device 108 may insert the call correlation information in the body of the SIP INFO request.

Given below is an example of an SIP INFO request when a text message is inserted after a few call rings or during a "180" ringing response from the called device 110:—

```
SIP INFO
    Info-Package: X (Package Name)
    <Call Correlation Info>
    From: Caller
    To: Callee
    Msg: "Grandpa hospitalized pick up"
```

Further, at step 406, the initiator client 210 may pass on the SIP INFO request containing the text message and the call correlation information to the call handling client 212. The call handling client 212 on the caller device 108 may then forward the SIP INFO request to the MMTel-AS at step 407. At step 408, the MMTel-AS forwards the SIP INFO request to the called device 110. The called device 110 may receive the SIP INFO request with the text message. In an example, the recipient client of the called device 110 receives the text message during the incoming call alert. The call is established at step 409 when the user of the called device 110 answers the call.

In some embodiments, the recipient client associated with the called device 110 may check if a call corresponding to the elements of the call correlation information (<call-correlation-info>) is found. If the call correlation information is found, then the recipient client checks the associated text message for the call and displays the text message during the incoming call alert. In some embodiments, the recipient client may further analyze the text message and validate the text message before the text message is displayed. The text message may be validated based on one or more factors. For example, the text message may be displayed if the caller is a known contact or if the caller is saved as a "favorite" contact on the called device 110 or if the caller is available in the recipient's frequent caller list. The text message may further be validated based on text mining of the text messages received during the incoming call using Natural Language Processing (NLP) and analytical methods based on the factors like information extraction, sentiment analysis and pre-defined keywords.

On viewing the text message associated with incoming call alert, the recipient may accept the incoming call and the call is established at step 407. In some embodiments, the recipient client upon receiving a text message over the voice call may store the text message in a call log associated with the called device 110 for unanswered calls and rejected calls. The recipient client may further be configured to generate an alert to the user with a popup text message including the text message for a pre-configured time duration.

Figure 5:
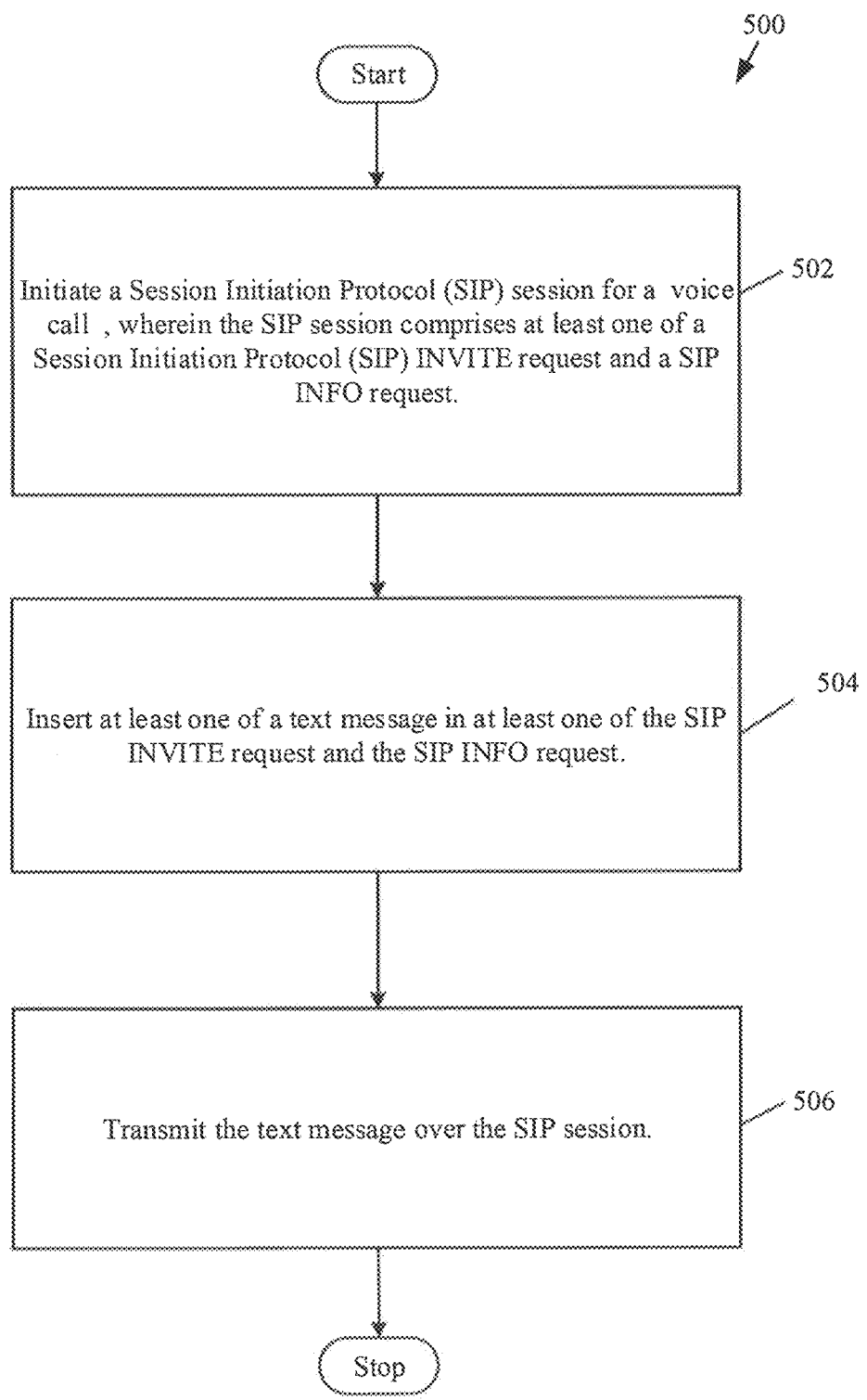
FIG. 5 is a flowchart illustrating a method for transmitting a text message over a voice call in accordance with some embodiments of the present disclosure.

FIG. 5 is a flowchart illustrating a method 500 for transmitting a text message over a voice call in accordance with some embodiments of the present disclosure. At step 502, a Session Initiation Protocol (SIP) session for a voice call may be initiated. The SIP session comprises at least one of a SIP INVITE request and a SIP INFO request. In some embodiments, the voice call may be initiated by enabling the call-reason feature in the calling device 108 as explained in conjunction with FIG. 2.

At step 504, the text message may be inserted in at least one of the SIP INVITE request and the SIP INFO request. In an embodiment, the text message may be inserted in the Session Description Protocol (SDP) body of the SIP INVITE request at the start of the voice call. In an embodiment, the text message may be inserted, at a later time of the voice call initiation, in the body of the SIP INFO request. In an embodiment, the text message may be inserted when a calling communication device receives a "180" ringing response, in body of the SIP INFO request. In an embodiment, the SDP body of the SIP INVITE may be a Multipurpose Internet Mail Extension (MIME) Session Description Protocol (SDP) body.

In some embodiments, inserting at least one of the text message and the call correlation information in the SIP INVITE request may include inserting a call-reason feature tag in a subject field of a SIP INVITE request header indicating the insertion of the text message for the voice call to a called communication device. For example, when the text message is inserted in the SIP INVITE request, a call-reason feature tag may also be inserted in the subject field of the SIP INVITE request header. The call-reason feature tag enables the called communication device like the called device 110 to identify that the SIP session is associated with the text message.

Further, in some embodiments, the insertion of the text message may also include inserting a call correlation information in at least one of the SIP INVITE request and the SIP INFO request. The call correlation information may be inserted in the SDP body of the SIP INVITE request or in the body of the SIP INFO request. The call correlation information may include at least one of an unique identifier of the calling communication device, an unique identifier of the called communication device, an unique identifier for identifying a Packet Switched (PS) call transaction, or the text message. In an embodiment, an SIP INFO package name and the call correlation information is inserted in the Session Description Protocol (SDP) body of SIP INVITE request when the text message is not inserted in the body of the SIP INVITE request for the SIP session. In another embodiment, the text message and the call correlation information is inserted in the body of the SIP INFO request when the text message is inserted during receipt of a "180" ringing response.

At step 506, the text message may be transmitted over the SIP session via one of the SIP INVITE request and the SIP INFO request. In an embodiment, the text message may be transmitted via the communication network 104 to the Multimedia Telephony Application Server (MMTel-AS) for the called device 110. In an embodiment, the text message may be transmitted with the SIP INVITE to the called device 110 via the MMTel-AS. In an embodiment, the text message may be transmitted with the SIP INFO request to the called device 110 via the MMTel-AS.

Computer System

Figure 6:
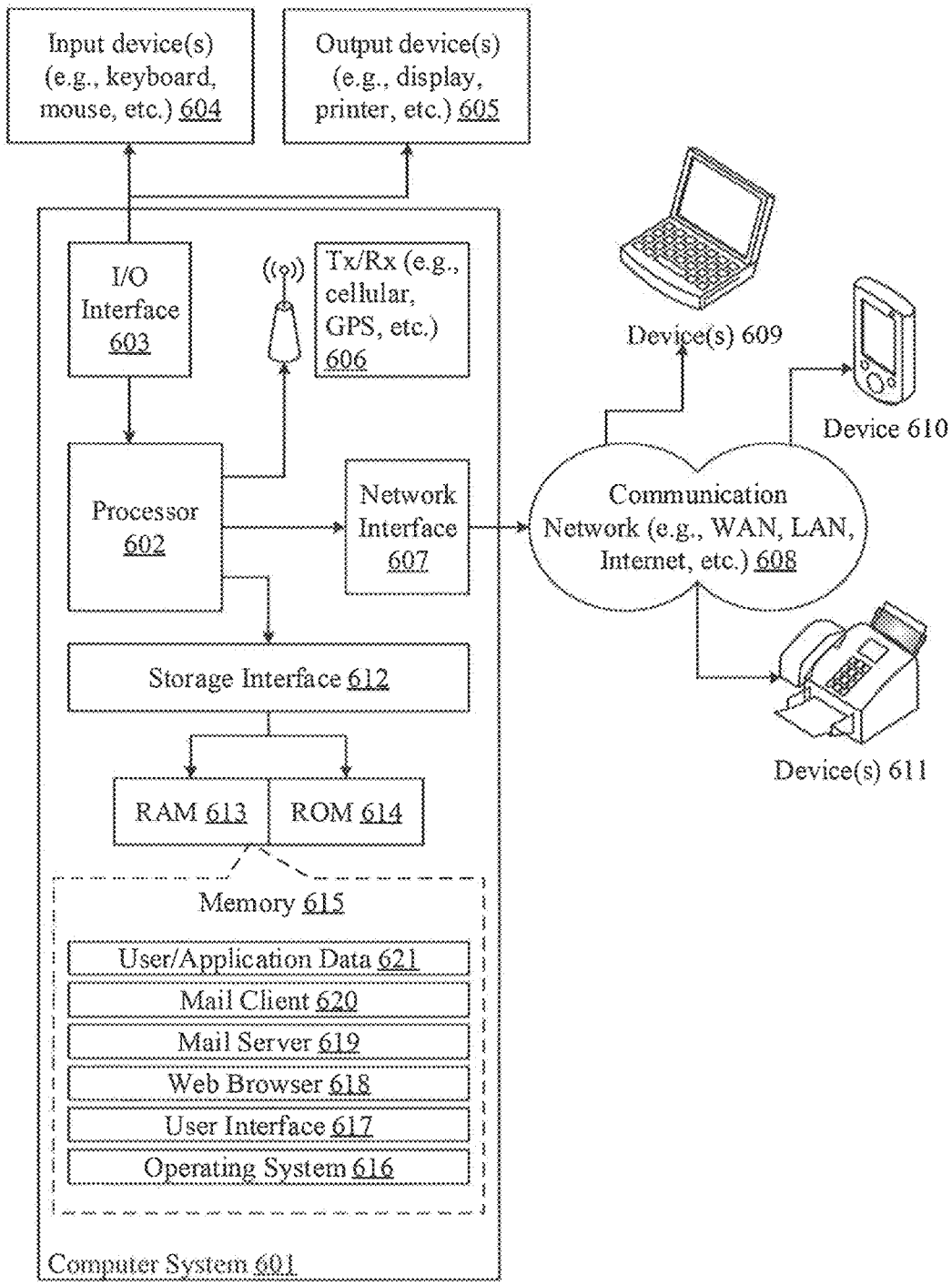
FIG. 6 is a block diagram illustrating an exemplary computer system for implementing embodiments consistent with the present disclosure.

FIG. 6 illustrates a block diagram of an exemplary computer system for implementing embodiments consistent with the present disclosure. Variations of computer system 601 may be used for transmitting a text message over a voice call. The computer system 601 may comprise a central processing unit ("CPU" or "processor") 602. The processor 602 may comprise at least one data processor for executing program components for executing user-generated or system-generated requests. A user may include a person, a person using a device such as such as those included in this disclosure, or such a device itself. The processor 602 may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/gin, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface 607 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 610, 611, and 612. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices referred in the FIG. 6 as Memory 615 (e.g., RAM 613, ROM 614, etc.) via a storage interface 612. The storage interface 802 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua. IBM OS/2, Microsoft Windows (e.g., Aero, Metro, etc.), Unix X-Windows, web interface libraries (e.g., ActiveX, Java, Javascript, AJAX. HTML, Adobe Flash, etc.), or the like.

In some embodiments, the computer system 601 may implement a web browser 618 stored program component. The web browser 618 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server 619 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server 619 may utilize communication protocols such as internet text message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client 620 may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a method and device for transmitting a text message over a voice. The illustrated steps are set out to explain the exemplary embodiments shown, and it should be anticipated that ongoing technological development will change the manner in which particular functions are performed. These examples are presented herein for purposes of illustration, and not limitation.

Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The present invention is based on Internet Protocol (IP) telephony. Most of these advantages flow from the fact that IP telephony is packet-based, rather than circuit-based, like the present phone system. This allows for a more efficient use of resources since one can use the same higher-layer protocol in a wide range of devices, from cell and desktop telephones to TVs, stereos, and computers. The layered protocols in IP telephony are capable of operating independently of one another.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

I claim:

1. A method of transmitting a text message over a voice call, the method comprising:
    initiating, by a calling communication device, a Session Initiation Protocol (SIP) session for the voice call with a called communication device, wherein the SIP session comprises a Session Initiation Protocol (SIP) INVITE request and a SIP INFO request;
    inserting, by the calling communication device, a text message in the SIP INFO request during call ringing of the voice call, wherein the text message is inserted when a callee associated with the called communication device does not answer the voice call after a predefined number of call rings;
    determining, by the calling communication device, whether the called communication device is capable of receiving and interpreting the text message inserted in the SIP INFO request; and
    transmitting, by the communication device, the text message in the SIP INFO request over the SIP session based on the determined capability of the called communication device, wherein the text message is displayed on the called communication device along with a call ringing notification of the voice call.

2. The method of claim 1, further comprising inserting call correlation information in at least one of the SIP INVITE request and the SIP INFO request.

3. The method of claim 2, wherein inserting at least one of the text message and the call correlation information in the SIP INVITE request comprises inserting a call-reason feature tag in a subject field of a SIP INVITE request header indicating the insertion of the text message for the voice call to the called communication device.

4. The method of claim 2, wherein the at least one of the text message, an SIP INFO package name and the call correlation information is inserted in at least one of a Session Description Protocol (SDP) body of SIP INVITE request and a body of SIP INFO request.

5. The method of claim 2, wherein the call correlation information comprises at least one of a unique identifier of a calling communication device, an unique identifier of the called communication device, an unique identifier for identifying a Packet Switched (PS) call transaction, or the text message.

6. The method of claim 1, wherein the text message transmitted to the communication device during the voice call is analyzed before the text message is displayed, wherein the analysis comprises performing text mining of the text message received during the voice call using Natural Language Processing (NLP) techniques based on call correlation information indicating an unique identifier of the calling communication device and frequency of calls from the calling communication device.

7. The method of claim 6, wherein the text message is displayed on the called communication device along with the call ringing notification of the voice call based on the analysis of the text message.

8. A calling communication device for transmitting a text message over a voice call comprising:
    a processor; and
    a memory communicatively coupled to the processor, wherein the memory stores processor-executable instructions, which, on execution, causes the processor to:
    initiate a Session Initiation Protocol (SIP) session for the voice call with a called communication device, wherein the SIP session comprises a Session Initiation Protocol (SIP) INVITE request and a SIP INFO request;
    insert a text message in at least one of the SIP INVITE request and the SIP INFO request in the SIP INFO request during call ringing of the voice call, wherein the text message is inserted when a callee associated with the called communication device does not answer the voice call after a predefined number of call rings;
    determine whether the called communication device is capable of receiving and interpreting the text message inserted in the SIP INFO request; and
    transmit the text message in the SIP INFO request over the SIP session based on the determined capability of the called communication device, wherein the text message is displayed on the called communication device along with a call ringing notification of the voice call.

9. The calling communication device of claim 8, further comprising inserting call correlation information in at least one of the SIP INVITE request and the SIP INFO request.

10. The calling communication device of claim 9, wherein inserting at least one of the text message and the call correlation information in the SIP INVITE request comprises inserting a call-reason feature tag in a subject field of a SIP INVITE request header indicating the insertion of the text message for the voice call to the called communication device.

11. The calling communication device of claim 9, wherein the at least one of the text message, an SIP INFO package name and the call correlation information is inserted in at least one of a Session Description Protocol (SDP) body of SIP INVITE request and a body of SIP INFO request.

12. The calling communication device of claim 9, wherein the call correlation information comprises at least one of a unique identifier of a calling communication device, an unique identifier of the called communication device, an unique identifier for identifying a Packet Switched (PS) call transaction or the text message.

13. A non-transitory computer-readable storage medium having stored thereon, a set of computer-executable instructions for causing a calling communication device comprising one or more processors to perform steps comprising:

initiating a Session Initiation Protocol (SIP) session for the voice call with a called communication device, wherein the SIP session comprises a Session Initiation Protocol (SIP) INVITE request and a SIP INFO request;

inserting a text message in the SIP INFO request during call ringing of the voice call, wherein the text message is inserted when a callee associated with the called communication device does not answer the voice call after a predefined number of call rings;

determining, by the calling communication device, whether the called communication device is capable of receiving and interpreting the text message inserted in the SIP INFO request; and transmitting the text message in the SIP INFO request over the SIP session based on the determined capability of the called communication device, wherein the text message is displayed on the called communication device along with a call ringing notification of the voice call.

14. The non-transitory computer-readable storage medium of claim 13, further storing computer-executable instructions for performing functions of inserting call correlation information in at least one of the SIP INVITE request and the SIP INFO request.

15. The non-transitory computer-readable storage medium of claim 14, wherein inserting at least one of the text message and the call correlation information in the SIP INVITE request comprises inserting a call-reason feature tag in a subject field of a SIP INVITE request header indicating the insertion of the text message for the voice call to the called communication device.

16. The non-transitory computer-readable storage medium of claim 14, wherein the at least one of the text message, an SIP INFO package name and the call correlation information is inserted in at least one of a Session Description Protocol (SDP) body of the SIP INVITE request and a body of the SIP INFO request.

17. The non-transitory computer-readable storage medium of claim 14, wherein the call correlation information comprises at least one of a unique identifier of the calling communication device, an unique identifier of the called communication device, an unique identifier for identifying a Packet Switched (PS) call transaction or the text message.

* * * * *